United States Patent Office 2,700,034
Patented Jan. 18, 1955

2,700,034

DYEABLE ACRYLONITRILE FILAMENT-FORMING COPOLYMER

Walter J. Zybert, Morris Township, Morris County, N. J., assignor to Allied Chemical & Dye Corporation, New York, N. Y., a corporation of New York No Drawing. Application March 28, 1951, Serial No. 218,081

2 Claims. (Cl. 260—85.5)

This invention relates to a filament-forming copolymer based on acrylonitrile, to filaments obtained therefrom, and to process of making the same.

Acrylonitrile homopolymer filament-forming compositions and filaments previously known have a combination of favorable properties including ease of preparation, spinnability from solution such as dimethyl formamide solution, good tensile strength, good elongation, good elasticity at least over short extensions, good heat resistance, good weathering characteristics, wool like warmth and others but have poor dyeability. Modifications of acrylonitrile by copolymerization to obtain filament-forming copolymers have heretofore been proposed including copolymerization with methacrylic acid esters such as ethyl methacrylate; but acrylonitrile-methacrylic acid ester copolymers previously described appear to require high pressure extrusion of the heated copolymer in plastic state for filament formation, rather than spinning from solution. Necessity for such high pressure, high temperature extrusion spinning, among other disadvantages of these prior copolymers, appears to make these prior art acrylonitrile-methacrylic acid ester copolymers unsuitable for commercial development. Proposed use of other comonomers in quantities to promote dyeability and solubility frequently results in polymers which lose too much tensile strength at elevated temperatures and therefore cannot be spun at desirable high speeds, and/or have other failings.

I have now discovered a readily spinnable, acrylonitrile-methyl methacrylate copolymer filament-forming composition and filament, and process for making the same. The filament obtained retains the properties of acrylonitrile based filaments above-noted and has special advantages including ready dyeability e. g. by acetate dyestuffs. The new filament appears unique, even as compared to ethyl methacrylate copolymer filament similarly prepared, in a number of respects; e. g. by treatment with alcoholic alkali as described below, its dyeability is markedly enhanced.

Characteristics of my acrylonitrile-methyl methacrylate copolymers include:

1. Overall composition about 60 to 85 parts by weight acrylonitrile and 40–15 parts by weight of methyl methacrylate, the product being a heterogeneous mixture of acrylonitrile-methyl methacrylate copolymer molecules those formed in the earlier stages of the copolymerization being relatively rich and those formed in the latter stages being relatively poor in methyl methacrylate.

2. Room temperature (25° C.) solubility, without gel formation, in e. g. dimethyl formamide at concentrations at least 10% by weight of solids;

3. Intrinsic viscosity of the polymer between about 1.5 and about 6;

4. Viscosity at room temperatures (25° C.) of 10% solutions in e. g. dimethyl formamide not above about 2000 poises:

5. Crystalline structure susceptible to orientation by extrusion and stretching operations, etc. to form fiber having oriented crystalline structure as indicated by characteristic X-ray diffraction patterns.

Characteristics of my filaments include:

1. Stretchability to at least 600%, preferably at least 800%, and best at least 1000% beyond the original length, at oven temperatures of at least about 140° C. and over oven temperature ranges of at least about 10° C., giving tensile strengths of at least about 1 gram per denier after stretching, and at least 3 grams per denier for preferred filament products;

2. Affinity for acetate dyestuffs, and susceptibility to chemical treatments increasing this affinity without serious loss in other properties;

3. Excellent resistance to acids and alkalis, e. g. virtually no tensile strength change after several months immersion in 10% aqueous caustic;

4. Excellent resistance, after a short elevated temperature preshrink treatment, to shrinkage in boiling water, with good retention of tensile strength; e. g. after a preshrink treatment, shrinkage in boiling water is less than 2%, ultimate tensile strength at break ranges from about 3 to 5 or more grams per denier, ultimate elongation at break is from about 15 to 30% and ultimate tensile strength at break, at temperature of 140° C., is at least about 1 gram per denier.

The above-noted characteristics of my spinning compositions and filaments distinguish them from other compositions and filaments from acrylonitrile based copolymers and contribute to their utility, as will be pointed out in connection with the description of my process which follows.

In accordance with my invention, about 60–85 weight percent of acrylonitrile, and methyl methacrylate as the balance of the polymerizable reactant, in aqueous medium at concentration below about 10 weight percent of monomers, are subjected to polymerizing conditions, preferably using a redox catalyst system, until between about 60% and substantially 100% by weight of the monomer reactants has formed copolymer, which is then fabricated as outlined below.

*Polymerizing*

Polymerization can be in aqueous solution but greater heterogeneity of composition results from a combination of aqueous solution and aqueous emulsion polymerizing mechanisms. Polymerization by other techniques including straight emulsion or granulation and bulk methods either fails to yield copolymer or gives product insoluble in all solvents, and/or sticky and practically impossible to purify and dry, and/or having poor spinnability.

At and below the saturation concentration of monomers in water, polymerization is by aqueous solution mechanism only. With one or both monomers at concentration exceeding the saturation value, emulsion polymerization mechanism comes in, increasingly the greater the monomer concentration.

Solubility of my monomer mixtures in water at the temperatures usually employed in my polymerizations (about 30°–50° C.) is roughly 5 per cent by weight.

Copolymer produced using monomer mixtures at concentrations above about 10% by weight of the reaction mixture brings in excessive emulsion polymerization whereby the copolymer forms gel instead of dissolving, or filaments obtained therefrom lack the tensile strength at elevated temperatures desired for drying and for stretching. Accordingly, monomer mixture concentrations in my process are maintained below about 10 parts per 100 parts of monomer-water mixture. Preferably, the monomer mixture concentrations are maintained below about 7% by weight of water and monomers. Once copolymer is formed, however, it is not necessary to remove it from the reaction mixture; the copolymer concentration in the reaction mixture can be and preferably is allowed to build up, e. g. to about 15%, while starting monomer mixture is replenished, to concentrations not above about 10% by weight of monomers, by addition of monomer mixture to the monomer-water reaction mixture.

With certain catalysts, such as persulfate, it has been found possible to obtain spinnable copolymer in absence of added reducing agent promoter of polymerization, but in general use of oxidizing agent-reducing agent (redox) catalyst is preferred. Various redox catalysts and various catalyst concentrations can be used, the choice of preferred formulations being dependent to some extent on conditions such as presence or absence of light, type of construction material of the reaction vessel, temperatures, etc.

Good results have been obtained with several redox catalyst systems operating at temperatures in the range between about 0° C. and about 50° C. Preferably the temperature selected is maintained constant within 1 or 2 degrees. Ordinarily higher temperatures, increased catalyst concentrations, and increased proportion of reducing compound:oxidizing compound in redox catalysts promote lower intrinsic viscosities of copolymer product.

Intrinsic viscosity alone does not determine suitability of copolymer for spinning, or ultimate filament properties; but intrinsic viscosities of satisfactory copolymer and should be between about 1.5 and about 6.

Suitable redox catalysts include ammonium or sodium persulfate with potassium or sodium bisulfite; permanganate with oxalic acid, e. g. potassium permanganate with oxalic acid; hypochlorite with ammonium ion, e. g. sodium hypochlorite with ammonium sulfate-ammonium hydroxide-cupric sulfate; etc. Bisulfite can serve as emulsifying agent or reducing portion of a redox catalyst system or both; in some cases it probably reacts with monomer or polymer with ultimate formation of a sulfonate emulsifier.

Under the conditions of the examples below, a satisfactory polymerization time is about 4 hours, but longer and shorter times can be used.

Other factors which influence properties of the product such as ease of separation from aqueous menstruum and spinnability are pH of the reaction mixture and presence of electrolytes in the reaction mixture. Initial pH can vary from about 2 to about 12; particularly favorable results are obtained in presence of buffers maintaining pH between about 2 and about 4, e. g. in presence of citric acid-disodium hydrogen phosphate buffer. Incorporation with the monomer polymerization mixture of salts such as potassium sulfate and sodium sulfate has favorable effect on spinnability of product and separability thereof from aqueous menstruum. Addition of these salts after polymerization does not give these favorable effects, but produces a pasty coagulum. Washing separated product under acid conditions, e. g. at pH below 2, also tends to improve spinnability.

Methyl methacrylate under my polymerization conditions above-outlined reacts considerably more rapidly than acrylonitrile; accordingly, the copolymer resulting from my process carried out at least to 60% of completion as above outlined is heterogeneous and contains polymeric molecules formed in the early stages of reaction which are relatively rich in methyl methacrylate and other polymeric molecules formed toward the end of reaction which are relatively poor in methyl methacrylate. Such mixture of copolymers, obtained as above outlined, has distinctly superior properties in terms of better coagulability of the dimethyl formamide solution by water and higher heat distortion temperature and lower heat shrinkage of copolymer filament compared to more homogeneous copolymer, having like overall composition but having only small composition differences between initially formed and later formed fractions, prepared e. g. by stopping the copolymerization reaction at relatively low conversions of monomers, or by adding most of the methyl methacrylate monomer during the copolymerization reaction period. The composition must be a true copolymer, however; mere mixtures of acrylonitrile homopolymer 60–85 parts and methyl methacrylate homopolymer 40–15 parts do not have all the desirable properties of my compositions.

Dissolving

The copolymer product is separated from the aqueous medium, washed and dried. Dry copolymer is then finely comminuted, e. g. by hammer milling and simultaneously separating powdered material through a screen, and is then dissolved to form the spinning solution. A suitable solvent is dimethyl formamide.

The method of comminuting the product is desirably one which minimizes mechanical working of the copolymer since such working tends to convert copolymer to a fibrous form which does not readily dissolve.

The finely divided copolymer obtained as above can be dissolved in e. g. dimethyl formamide at room temperatures, e. g. 25° C., by working it in, stirring the solution in the direction from top to bottom of the container rather than agitating in a horizontal path. Alternatively the solvent can be chilled, the finely divided copolymer can be suspended therein and the mixture can then be warmed with agitation to dissolve the suspended copolymer. Solutions having at least about 10% by weight of solids are obtained having viscosities at room temperatures suitably between about 300 and about 2000 poises, which solutions can be wet spun and/or dry spun.

The solutions are filtered to remove foreign materials and any gel particles. Tendency to give gel particles can be reduced by milling at elevated temperatures on rollers.

Wet spinning

The solution is wet spun into filamentary form, e. g. through a multi-hole spinneret to form a multi-filament yarn.

Copolymer wet spun from a solvent such as dimethyl formamide is coagulated in two distinct steps. The first step is an extrusion of the solution up through a spinneret into a warm water bath in which the surface of the jet of viscous solution is gelled by extraction of dimethyl formamide and infusion of water at the surface. The second coagulation step is passage of the surface-gelled filament through a hot evaporating zone, wherein solvent from the interior of the filament diffuses to the filament surface and evaporates therefrom, and simultaneously gel solidifies by syneresis into a coherent, non-porous, stretchable solid filamentary structure. In the first step above mentioned the water removes 75 to 85% of the dimethyl formamide solvent from the filament and leaves a surface-gelled filament retaining 50–80% by weight of dimethyl formamide. It is important that in the first step of spinning the above copolymers into an aqueous bath from a solvent such as dimethyl formamide, the action of the water be confined to the filament surface. Too extensive penetration of water into the filamentary structure results in a filament which is too chalky and brittle throughout for further processing at high spinning speeds.

The aqueous bath will contain dimethyl formamide introduced from the filaments being processed. The dimethyl formamide content of the bath should not exceed about 30% by volume, and suitably is maintained at about 20% by volume.

The first treating step above outlined rapidly leaves the surface of the filament non-tacky and increases the strength of the filament to the point of at least about 0.1 gram per denier at which strength the filament can be passed on through the subsequent spinning steps at good speed without breakage; and leaves the filament flexible enough to permit further processing at good speed. But to obtain high tensile strength, solvent must be further removed.

Upon passage of the surface-gelled filament, still retaining about 50–80% by weight of dimethyl formamide solvent, through a hot evaporating zone, the solvent diffuses from the interior of the filament and eventually evaporates from the filament surface. At the same time the filament coalesces into a solid, translucent structure. The temperatures reached in the drying zone are desirably adjusted to allow the fastest possible spinning, by giving the fastest possible evaporation without being so high as to reduce tensile strength to the point where breakages are encountered. Drying oven temperatures found suitable generally are in the range between about 100° and about 200° C. Filament thus dried, in which the dimethyl formamide solvent content has been reduced to the range of about 2.5–10% by weight, shows a tensile strength increase to at least about 0.5 gram per denier and can be satisfactorily passed on through stretching steps which enhance the tensile strength.

Filament containing about 6% or less of dimethyl formamide solvent shows greater enhancement of tensile strength upon stretching than filament with as much as 8% of dimethyl formamide. Accordingly, the dimethyl formamide content of the filament is 8% or less, preferably 6% or less, before the stretching step. A dimethyl formamide content of at least about 2.5% by weight in the filaments should be maintained, however, in order to facilitate stretching.

Stretching

Stretching can be started in the drying zone, but should be completed after the filament has been dried at least down to about 10% by weight of dimethyl formamide. Stretching is suitably accomplished by winding up filament at a rate faster than the rate of feed into the stretch oven by the factor necessary to impart the desired stretch.

In order to be spinnable at high rates in terms of feet per minute of stretched filament, a filament must have high stretching characteristic under spinning conditions. To promote rapid completion of drying, and the desired high stretchability, the stretch oven temperature should be at least about 140° C. The characteristics of the finished filament should not be unduly sensitive to small differences in temperature used in the stretching oven.

My filaments, as above-noted, have desirable stretching characteristics. They stretch at least about 600%, usually at least 800%, beyond their original length at oven temperatures of at least 140° C. and over oven temperature ranges of at least 10° C., and during such stretching acquire tensile strengths of at least 1, and up to 3-6 or more grams per denier. Filaments from preferred operations disclosed in the examples show ultimate tensile strengths of about 4-6 grams per denier and stretch 1000% or more at stretch oven temperatures at least about 150° C.

Dry spinning

Copolymer prepared as above described and dissolved as above can be made up at concentrations and viscosities suitable for dry spinning. Concentrations of about 20-30 weight percent in hot solvent can be made. A particular advantage of my copolymers is that even in solutions of these concentrations, solution viscosities are low enough at elevated temperatures, e. g. 90°-140° C., to permit extruding through spinnerets under relatively low pressures such as 100 p. s. i. Accordingly it is unnecessary to sacrifice valuable properties such as tensile strength and chemical stability in the final yarn to get a readily dry-spinnable copolymer.

Preshrinking

After stretching, the filament can be improved in its properties of capacity for elongation without breaking, and resistance to shrinking at elevated temperature, e. g. shrinking in boiling water, by pre-shrinking the filament at elevated temperature, above 100° C. but below decomposition temperatures, suitably by winding up through a heated shrinking oven at a rate slower than the feed rate by the factor corresponding to the desired contraction in length. Such treatment produces no more than a tolerable loss of tensile strength acquired on stretching.

Dyeing

The filament can be dyed, suitably wtih an acetate dyestuff, and/or subjected to other treatments incidental to fabrication thereof into fibers, threads, yarns, cloth, screening, netting, cordage, bristles, etc.

My filaments prepared as above-outlined reach a medium level of dyeing upon treatment at the boil in aqueous acetate dyestuff bath.

A filament with particularly enhanced affinity for acetate dyestuffs can be obtained by immersing a stretched filament prepared as above-described in an alcoholic alkali bath, e. g. by immersing about 2 hours at about 50° C. in a solution of 5 weight percent potassium hydroxide in methanol. This treatment is believed to convert carbomethoxy side chains in the copolymer molecules to carboxylic anions. Filament so treated is dyed to a deeper shade by acetate dyestuffs and moreover shows increased elongation over untreated filament, with only moderately lowered tensile strength, e. g. about 50% increase in elongation and less than 10% loss in tensile strength. Other chemical treatments also increase dyeability, including treatment with alcoholic acid, e. g. 5% alcoholic sulfuric acid, and treatment of copolymer (before the spinning step) with methanol solution of isobutylene diamine or with a salt of an amino acide such as beta-alanine sodium salt.

The examples which follow are illustrative of my invention, but are not to be understood as limiting the same.

The acrylonitrile employed in the examples was a commercial product purified before use. Distillation is a satisfactory purification method. The methyl methacrylate was a commercial product purified by distillation at atmospheric pressure.

Distilled water was used in making up the polymerization reaction mixtures. The catalyst materials were commercial products. The polymerization vessel in Examples 1 and 3 was of glass, and in Examples 2 and 4 was a stainless steel kettle, and was fitted with stirrer, reflux condenser, thermometer and inlet tube for nitrogen which was passed over the reaction mixture to avoid inhibitory action of oxygen of the air. Carbon dioxide is another satisfactory inert atmosphere for polymerization.

Intrinsic viscosities of copolymer were determined in Ostwald-Fenski tubes at 40° C. on 0.125 gram of copolymer per 100 cc. of dimethyl formamide solution and can be stated as equalling (time of efflux of solution —time of efflux of same volume of pure dimethyl formamide)÷(0.25×time of efflux of the same volume of pure dimethyl formamide). Intrinsic viscosity is a measure of average molecular weight of the copolymer.

Viscosities of the dimethyl formamide spinning solutions were measured in a rotating viscosimeter at room temperatures (about 25° C.). The spinnabilities of the solutions of the examples were judged against solutions of other acrylonitrile polymers and copolymers on the basis of speed of spinning which could be reached without breakage, uniformity in denier and tensile strength of the multifilament yarns obtained, and freedom from breakage in continuous operation. Spinning for testing purposes was through a 48 hole spinneret, each hole 5 mils in diameter, up through a warm water bath maintained at about 50°-94° C., of depth about ¾ inch to 10 inches and with a surface layer of toluene or methylcyclohexane to prevent formation of a capillary column of liquid between the emerging filaments, which would tend to stick them together.

Percentages and ratios quoted herein are on a weight basis. "Ultimate tensile strength" (U. T. S.) of the yarns quoted in the examples is tensile strength at break in grams of tension per denier. "Ultimate elongation" (U. E.) is percent increase reached at breaking point beyond original length. Denier is for the multifilament yarn. Shrinkage in boiling water is measured after 15 minutes exposure.

EXAMPLE 1

A 22 liter reaction vessel was charged with 16.7 liters of water and 1300 grams of acrylonitrilemethyl methacrylate monomers in weight ratio of 80:20 of acrylonitrile:methyl methacrylate. Temperature was maintained at 35°±0.5° C. for 30 minutes. A solution consisting of 18.2 grams ammonium persulfate in 800 ml. of water and another solution consisting of 3.9 grams of sodium metabisulfite in 500 ml. of water were then added followed by a 200 ml. water rinse. Polymerization began practically immediately and was continued 4 hours.

The product was filtered and washed free of salts with water, and the water was removed by washing with methanol and drying. The dried copolymer amounted to 90% by weight of the monomers employed. Residual unreacted monomer in the filtrate contained only traces of methyl methacrylate.

The copolymer had intrinsic viscosity, measured in dimethyl formamide solvent as above described, of 3.67, corresponding to average molecular weight of approximately 150,000.

Copolymer was dissolved for spinning in dimethyl formamide by mixing finely divided copolymer into dimethyl formamide at room temperature as above outlined. The solids content of the resulting solution was about 13% by weight and its viscosity was about 660 poises.

The solution was spun for testing as above outlined. At stretch oven temperature reaching 160° C. in the oven used for testing stretch, a stretch of 1120% over the original length was applied without occasioning breakages of yarn during spinning. Ultimate tensile strength of yarn thus obtained was 5.5 grams per denier at denier of 65.

A still higher percent of stretch could safely be used at 150° C. measured temperature of this oven, namely, 1300%.

As above noted, drying and stretch oven temperature optima are set by aim of maximum spinning speed and by necessity to remove solvent and necessity to retain adequate tensile strength in filament being treated. In the larger scale apparatus referred to below, oven temperatures reach 200° C. and above.

After 3 days storage the spinning solutions of this example showed practically no change in viscosity, in degree of stretch without breakages at given temperature, or in ultimate tensile strength of the yarns spun therefrom.

The preparation and spinning of copolymer above described was carried out repeatedly in substantially the same manner and gave good reproducibility:spinning properties of the solutions, fresh and aged 3 days, were uniformly satisfactory using stretch temperatures of 150°–160° C. in the test oven; and ultimate tensile strengths of the yarns were all good, varying from 4.9 to 5.8 grams per denier. Yarns were obtained in larger scale continuous spinning of these copolymers at a rate of 428 feet per minute using 1060% stretch, which yarns had ultimate tensile strength of about 4.2 grams per denier at 108 denier.

Yarn prepared under conditions as in the above example was immersed 2 hours in 5% alcoholic potassium hydroxide at 50° C. The yarn thus treated had greatly increased affinity for dyestuffs; e. g. it was dyed to deep levels by acetate dyestuffs such as Nacelan Red. Its ultimate tensile strength was reduced by the hydrolytic treatment not more than about 10% and its elongation to break was increased to about 13% beyond the original length instead of 8% as for the untreated yarn.

A sample of the same yarn similarly treated with 5% alcoholic sulfuric acid showed definitely increased dyeability with no loss in tensile strength (but no appreciable change in elongation).

The polymer chain in the filament treated as above is believed to be represented by the empirical formula

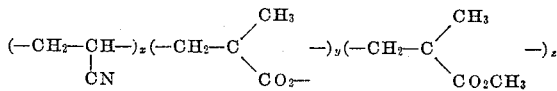

A typical acrylonitrile-methyl methacrylate yarn prepared under conditions as in the above example, and not preshrunk, showed shrinkage in boiling water of 14%.

Copolymerization of methyl methacrylate with acrylonitrile, followed or not by hydrolysis of methoxy groups, while conferring dyeability does not seriously depreciate desirable properties of straight polyacrylonitrile such as tensile strength, weathering resistance, heat resistance, wool-like warmth, elasticity, etc. An acrylonitrile-methyl methacrylate yarn typical of those prepared as in this example showed the following properties after preshrinking for a few minutes at oven temperatures of about 180° C., causing about 20–25% shrink:

| | |
|---|---|
| Ultimate tensile strength | 4.7 g./d. |
| Elongation to break | 15%. |
| Shrinkage in boiling water | Less than 1%. |
| Elastic recovery | From 2% stretch—98% regain; from 4% stretch—89% regain; from 6% stretch—85% regain. |
| Dyeability | Readily dyed to medium shade by "Nacelan Red" acetate dyestuff. |
| Acid and alkali resistance | 0–10% loss of U. T. S. after 4 mos. immersion in 37% HCl, 40% HNO$_3$, 35% H$_2$SO$_4$, 10% NaOH. |
| Weathering | Upon outdoor exposure for 1 year lost less than 5% U. T. S. |

A commercial polyacrylonitrile yarn tested in the same manner as the above showed the following values for the properties above listed:

| | |
|---|---|
| Ultimate tensile strength | 4.2 g./d. |
| Elongation | 14.5%. |
| Shrinkage in boiling water | About 1%. |
| Elastic recovery | From 2% stretch—90% recovery; from 9% stretch—85% recovery. |
| Dyeability | Almost no color whether treated or not with alcoholic alkali or acid. |
| Acid and alkali resistance | 10–20% loss of U. T. S. after 4 mos. immersion in the above solutions. |
| Weathering | Lost about 30% U. T. S. in 1 yr. of outdoor weathering. |

EXAMPLE 2

A 25 gallon charge of water and 7 weight percent methyl methacrylate-acrylonitrile monomers in 20:80 weight ratio containing 0.60% by weight on the monomer mixture of ammonium persulfate and 0.24% (same basis) of sodium metabisulfite was copolymerized in a stainless steel kettle at 35° C. for 5 hours as described in Example 1 above. The yield of copolymer, recovered as in Example 1, was about 60% by weight of the monomers. It had intrinsic viscosity of 4.16.

The copolymer was spun as above described. In the testing apparatus it spun well, showing stretch of 1060% without breakage at 155° C., and 1120% at 165° C. stretch oven temperature. Yarn stretched at 165° C. had ultimate tensile strength of 5.5 grams per denier at denier of 53.

EXAMPLE 3(a)

Acrylonitrile and methyl methacrylate were copolymerized in presence of stainless steel under conditions similar to Example 2 except that (a) the weight ratio of monomers in the monomer mixture was 84:16 of acrylonitrile:methyl methacrylate and (b) additional monomer mixture (bringing total monomer reactants to about 17% by weight of the aqueous suspension medium) was introduced continuously to the reaction vessel during the first hour of polymerization at a rate to maintain monomer concentrations below 7% by weight of the reaction mixture. Reaction thereafter was continued for 2 hours. The initial catalyst concentrations were 1.53% of ammonium persulfate and 0.612% of sodium metabisulfite based on the initial weight of monomer mixture (about 7% by weight of the aqueous medium).

The yield of copolymer was 86% by weight of total monomer reactants. It had intrinsic viscosity of 5.23.

In test spinning the yarn from this copolymer could be stretched 840% without breaking at 155° C. oven temperature, 1120% at 160° C., and 1000% at 165° C. The ultimate tensile strength of yarn stretched at 165° C. was 6.2 grams per denier at denier of 52.

Copolymers from mixtures of monomers containing above about 85 weight percent of acrylonitrile monomer begin to lose dyeability.

EXAMPLE 3 (b)

When the proportion of methyl methacrylate in the initial monomer mixture was increased from 20 weight percent to 25, 30, 35 and 40 weight percent, with operations otherwise as in Example 1, U. T. S. of the preshrunk yarn dropped correspondingly to about 3.5 g./d. at 25 weight percent methyl methacrylate, about 3.2 g./d. at 35 percent and about 2.8 g./d. at 40 percent. These copolymers derived from monomer mixtures initially containing more than about 25% by weight of methyl methacrylate showed also less heat resistance than copolymers from 20:80 monomer mixtures at 120° and 140° C. 30:70 and 35:65 copolymers had U. T. S. about 1 g./d. where copolymers from 20:80 methyl methacrylate:acrylonitrile monomer mixtures had U. T. S. at these temperatures of 1–2 g./d.

In accordance with the foregoing, I use monomers in overall weight ratio between about 60:40 and about 85:15 of acrylonitrile:methyl methacrylate, preferably about 80:20 monomer weight ratio.

EXAMPLE 4

A. *Polymerization technique*

6.5 kilograms of a 20:80 methyl methacrylate:acrylonitrile monomeric mixture and 89 liters of distilled water were stirred for 30 minutes in a 25 gallon stainless steel kettle under a N$_2$ atmosphere. 52 grams of (NH$_4$)$_2$S$_2$O$_8$ and 20.8 grams of Na$_2$S$_2$O$_5$ were then added to catalyze the polymerization. 83.8 grams of K$_2$SO$_4$ and 81.3 grams of Na$_2$SO$_4$ were also added to enhance the filterability of the final reaction product. The catalyst and salts were added in the form of a dry powder; 2 additional liters of distilled water were then added to the reaction mixture. A reaction temperature of 35±1° C. was maintained for 4 hours and the polymerization proceeded under an atmosphere of nitrogen. The final reaction product, which was a freely flowing slurry, was filtered. Polymer was washed and dried to constant weight. Yield was 88%. Polymer had intrinsic viscosity of 3.1.

B. *Dry spinning*

A solution consisting of 22 parts of the above copolymer and 88 parts of dimethyl formamide was prepared and then deaerated by maintaining the solution at 100° C. for 7 hours. Solution was then heated to 132° C. and, under a pressure of 100 lbs. per sq. in., extruded downwards through a spinneret having 48 holes 3 mils in diameter into a 7 foot dryer. Temperature of air at the bottom of this dryer was 83° C.; temperature of gases (air and evaporated solvent) at the top was 188° C.

Yarn emerging from the bottom of this dryer was then passed around a series of pulleys and brought upwards through a 3.5 foot dryer wherein the air temperature at the center was maintained at 200° C. Finally yarn was passed through a horizontal 3 foot oven wherein air temperature was maintained at 140° C. This horizontal oven is not an essential part of the dryer system but serves to plasticize by heat a length of yarn near the windup, giving the yarn sufficient stretchability to absorb any jerking during windup without breaking.

Yarn emerged from this final oven at a linear speed of 51 ft./min. At this point yarn possessed a volatile content of 12%, a U. T. S. of 0.6 g./d., a U. E. of 118%, and a denier of 704. After this yarn had been stretched 770% at 190° C., the U. T. S. rose to 5.0 g./d., U. E. dropped to 6.0% and the denier decreased to 82. Shrinkage of this stretched yarn after 15 minutes in boiling water was 14–15%. The color, luster, and dye receptivity of this dry spun yarn was equivalent to that of other 20/80 methyl methacrylate/acrylonitrile yarns prepared by the wet spinning technique previously described.

After the above yarn had been relaxed 20% at 180° C., its U. T. S. dropped from 5.0 to 3.0 g./d. and its U. E. rose from 6% to 20%. At 120° C. this relaxed yarn possessed a U. T. S. of 1.4 g./d.; at 140° C., U. T. S. was 1.2 g./d.

Another portion of the above dry spun yarn was stretched 610% at 180° C. Final U. T. S. was 3.3 g./d. and U. E. was 6.5%. After this yarn had been relaxed 25% at 160° C., U. T. S. decreased slightly to a value of 2.8 g. d., and U. E. increased to 22%. At 120° C. this relaxed yarn possessed a U. T. S. of 1.2 g./d.; at 140° C. U. T. S. was 1.1 g./d.

I claim:
1. Process of producing acrylonitrile-methyl methacrylate copolymer suitable for spinning into filament which comprises introducing acrylonitrile and methyl methacrylate monomers in weight ratios of monomers between about 60:40 and about 85:15 of acrylonitrile:methyl methacrylate into aqueous medium, establishing a monomer phase distinct from the aqueous medium, maintaining monomer mixture concentrations below about 10 weight percent of the monomer-water reaction mixture, and maintaining polymerization conditions until between about 60% and substantially all of the monomers have reacted; and wherein at least in the initial stages of the polymerization the monomers are emulsified.

2. Process as defined in claim 1 wherein the concentrations of monomer mixtures are maintained below about 7 weight percent of the monomer-water reaction mixture and redox polymerization catalyst is employed.

References Cited in the file of this patent
UNITED STATES PATENTS

| | | |
|---|---|---|
| 2,412,034 | D'Alelio | Dec. 3, 1946 |
| 2,436,926 | Jacobson | Mar. 2, 1948 |
| 2,486,241 | Arnold | Oct. 25, 1949 |